July 13, 1948.  J. J. PARKER ET AL  2,445,184
MANDREL
Filed Sept. 10, 1947 3 Sheets-Sheet 1
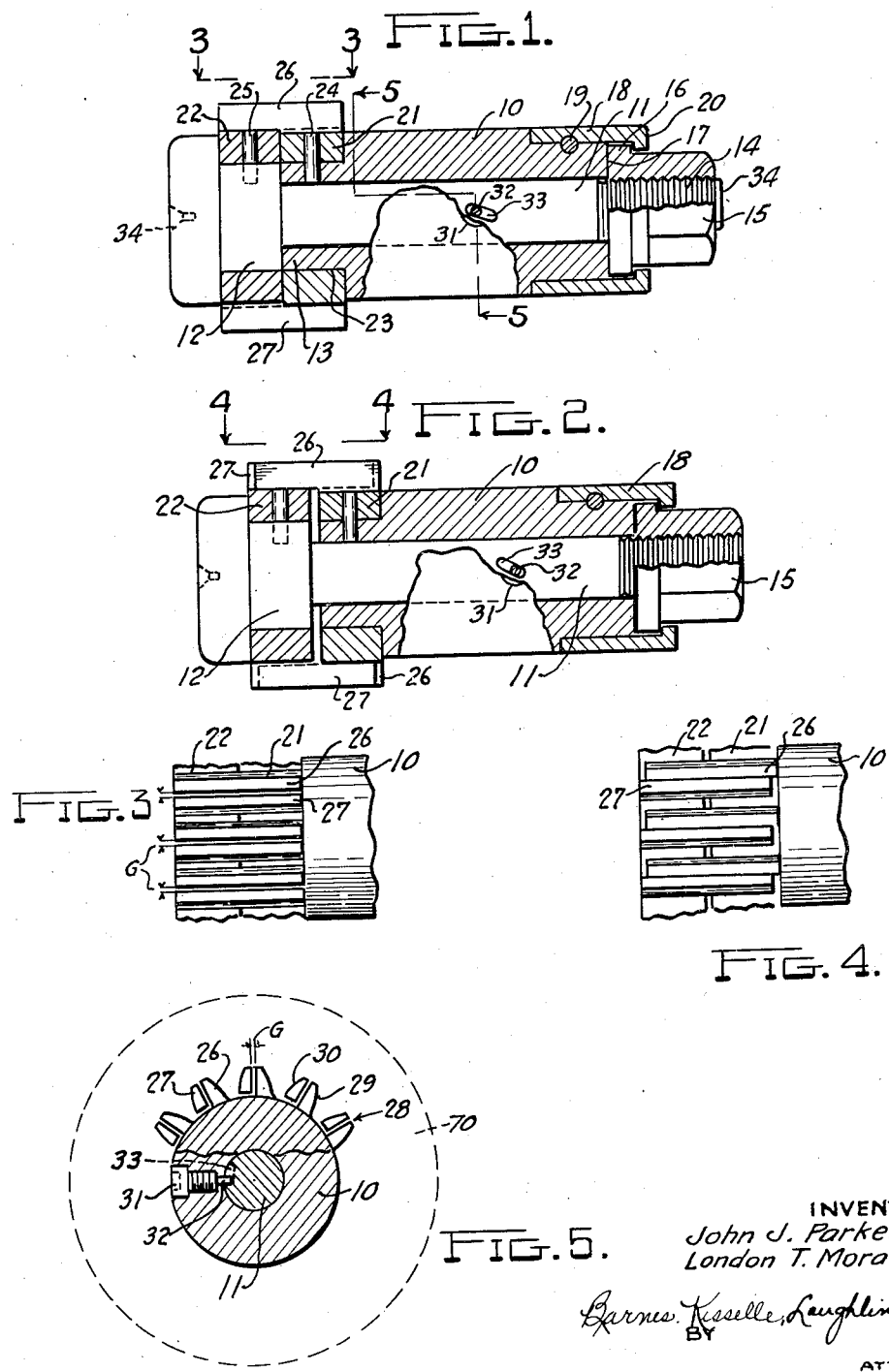
INVENTORS
John J. Parker
London T. Morawski
ATTORNEYS July 13, 1948.   J. J. PARKER ET AL   2,445,184
MANDREL
Filed Sept. 10, 1947   3 Sheets-Sheet 2
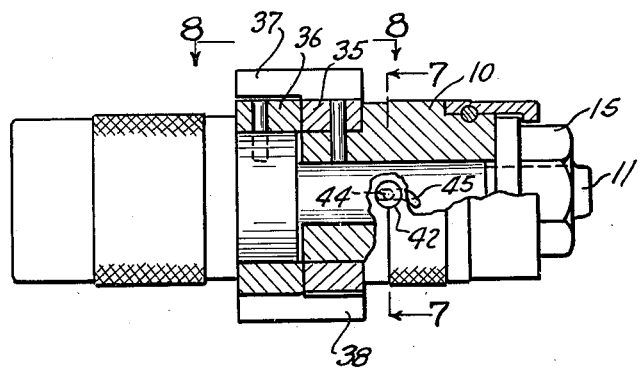
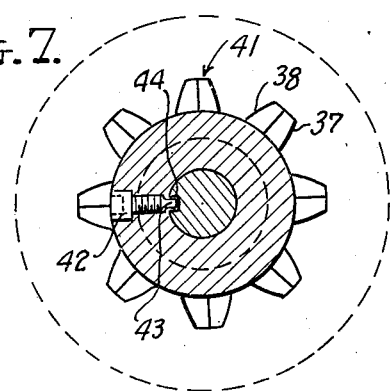
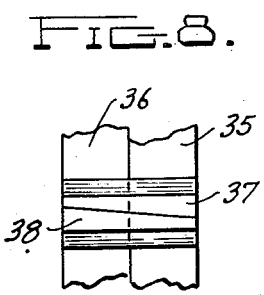
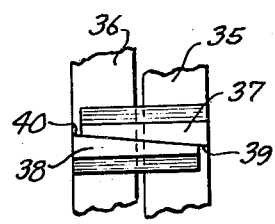
INVENTORS
John J. Parker
London T. Morawski July 13, 1948.  J. J. PARKER ET AL  2,445,184
MANDREL
Filed Sept. 10, 1947  3 Sheets-Sheet 3
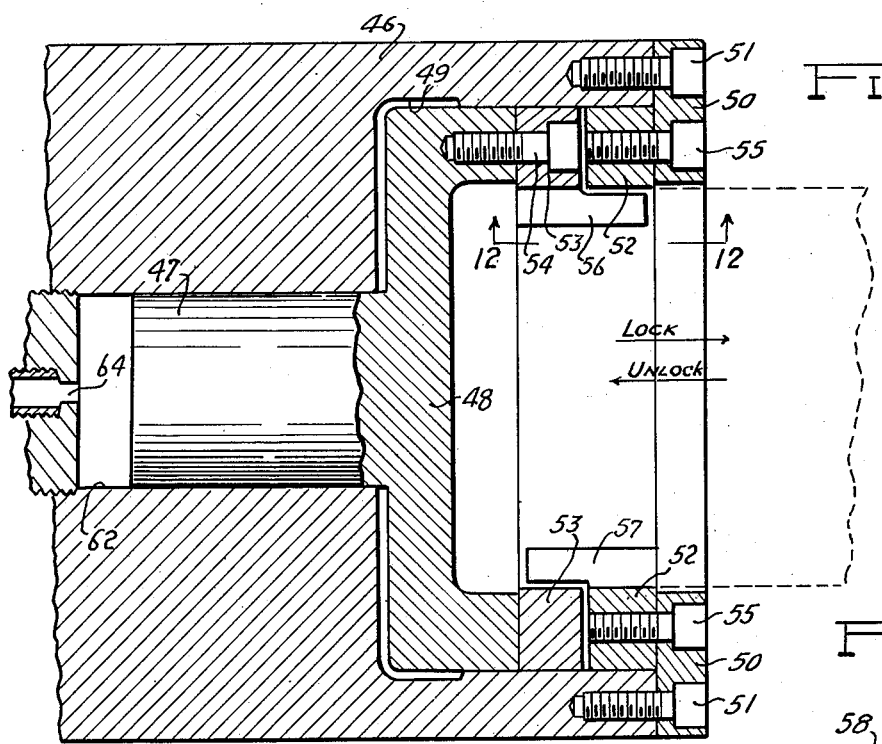
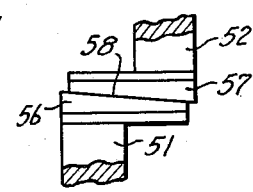
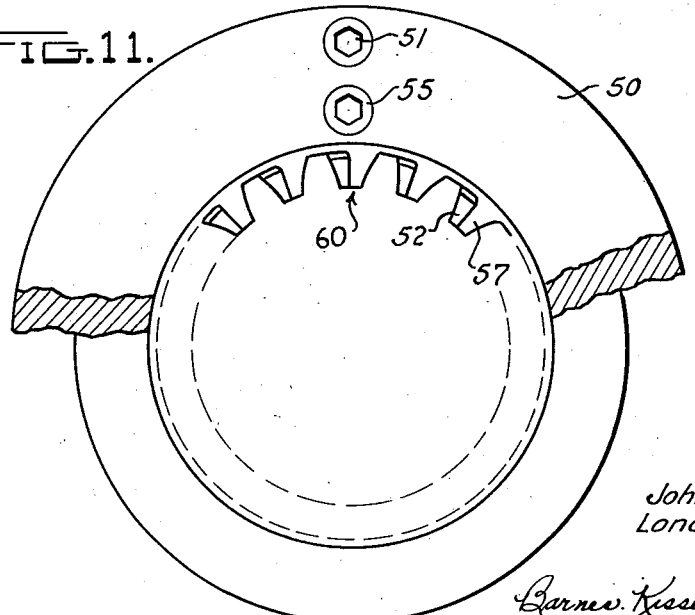
INVENTOR
John J. Parker
London T. Morawski
BY Barnes, Kisselle, Laughlin & Raisch
ATTORNEYS Patented July 13, 1948

2,445,184

UNITED STATES PATENT OFFICE 2,445,184

MANDREL

John J. Parker and London T. Morawski,
Detroit, Mich.

Application September 10, 1947, Serial No. 773,166

9 Claims. (Cl. 279—1)

This invention relates to a mandrel and more particularly to an adjustable and self centering mandrel for holding gears, splined shafts and the like.

During the manufacture, testing and finishing of gears and splined members, it is often required that the work piece be gripped and held on the tooth surface of the work piece so that various operations may be performed on another surface of the work piece. Moreover, in some instances, such as in checking and finish grinding gears and the like, it is imperative that perfect concentricity between the work piece and the holder is maintained at all times so that very accurate dimensions may be obtained.

Mandrels commonly used for this purpose are necessarily expensive since they must be precision made and each size of work piece requires a separate mandrel of a corresponding size even though the difference between work pieces may be very slight. In gears for instance, the difference between one gear and another may be solely in the number of teeth, or the size or spacing of the teeth.

Accordingly, the principal object of the present invention is to produce a mandrel which is adapted to firmly engage on the tooth surface of a work piece in a manner which insures perfect alignment of the work piece with respect to the mandrel.

It is also contemplated to provide a mandrel which is adjustable within certain limits to hold gears and the like of different sizes so that a single mandrel may serve as a holder for a plurality of different size work pieces.

The accompanying drawings illustrate several mandrels constructed in accordance with the invention.

Fig. 1 is a side elevation, partly in section, of a mandrel of this invention illustrating the relative positions of the parts when the mandrel is in the locked condition.

Fig. 2 is a view similar to Fig. 1 showing the parts in the unlocked condition.

Fig. 3 is a view taken substantially along line 3—3 of Fig. 1 showing the tooth portions of the mandrel in the expanded or locked condition.

Fig. 4 is a view taken substantially along line 4—4 in Fig. 2 showing the tooth portions in the unlocked condition.

Fig. 5 is a sectional view taken along line 5—5 of Fig. 1 showing the mechanism for imparting relative circumferential movement to the separate sets of tooth portions of the mandrel.

Fig. 6 is a side elevation, partly in section, of a modified form of mandrel, the mandrel being shown in the locked condition.

Fig. 7 is a sectional view taken along line 7—7 in Fig. 6.

Fig. 8 is a view taken along line 8—8 in Fig. 6 showing the tooth portions of the mandrel in the locking position.

Fig. 9 is a view similar to Fig. 8 showing the tooth portions in the unlocked position.

Fig. 10 is a sectional view of another form of mandrel of this invention in the form of a gear chuck adapted for gripping the external surface of a work piece and which is also adapted for hydraulic actuation.

Fig. 11 is an end view of the mandrel shown in Fig. 10.

Fig. 12 is a view taken substantially along line 12—12 in Fig. 10 showing the tooth portions of the mandrel.

Referring to the drawings, there is shown in Figs. 1-5 one form of mandrel of this invention which comprises an outer sleeve 10 and a bolt 11 extending through the sleeve and arranged for both axial and circumferential movement within the sleeve. Bolt 11 is provided at one end with an enlarged shoulder 12 which is arranged to abut against the adjacent end 13 of the sleeve 10. At the other end bolt 11 projects beyond sleeve 10 and is threaded as at 14 for engagement with a nut 15 having an enlarged shoulder 16 which bears against the end face 17 of the sleeve. Nut 15 is retained on the end of sleeve 10 by means of a retainer 18 fixed to the sleeve as by a pin 19 and having an inwardly extending annular flange 20 which engages behind shoulder 16 of the nut. It will be seen that as nut 15 is turned in either direction it engages threads 14 and causes bolt 11 to move axially of the sleeve.

At the end opposite nut 15 the sleeve and bolt are provided with a pair of ring members 21 and 22 respectively. Ring 21 seats within a recessed portion 23 at the end 13 of sleeve 10 and is fixed to the sleeve by means of a pin 24. Ring 22 is fitted on shoulder 12 of bolt 11 and is fixed to the bolt by means of a pin 25. The two ring members are each provided with partial gripping teeth. As illustrated in Fig. 1, ring 21 is provided with partial teeth 26 and ring 22 with partial teeth 27. The teeth are integral with their respective ring members and as shown in Fig. 3 they overlap each other their full length when the ring members are disposed in face to face relation. Or in other words, each tooth projects axially from its respective ring member a distance equal to the width of the complemental ring member. In the assembled position teeth 26 extend over the peripheral portions of ring 22 and teeth 27 project axially over the peripheral portions of ring 21 as is best shown in Figs. 3 and 4. The complemental partial teeth also cooperate to form a plurality of composite teeth 28 having exterior surfaces shaped to the contour desired. These surfaces, indicated as 29 and 30 in Fig. 5, may be formed or generated by grinding or machining as involute, straight or the like and the teeth 28 may be helical in shape to cooperate with splines and gears of that type. The inner adjacent surfaces are substantially radial and are arranged to be disposed either in contact with each other or spaced apart by imparting relative circumferential movement to the respective ring members 21 and 22.

The sleeve 10 and bolt 11 are interconnected witht simple means for imparting relative circumferential movement to these parts as the bolt is moved axially within the sleeve. These means preferably comprise a stud 31 threaded into sleeve 10 having a projecting end 32 projecting into and guided within an elongated slot 33 formed on the surface of the bolt and inclined to the axis of the bolt as shown. Slot 33 is disposed such that when bolt 11 is advanced within nut 15, that is, when ring members 21 and 22 approach each other, the partial teeth 26 and 27 in each pair move away from each other. And likewise by turning nut 15 so as to slide the bolt outwardly from the sleeve, the partial teeth in each pair are caused to move toward each other. From the foregoing it will be readily appreciated how composite teeth 28 may be loosely interfitted with a gear or spline portion of a work piece and be expanded by tightening nut 15 on bolt 11 to lock the work piece concentrically on the mandrel, as is shown in Fig. 5 where numeral 70 generally indicates a work piece.

The bolt 11 may be provided with means such as center holes 34 at each end of its axis for accurately aligning the mandrel with the centers of a machine.

In Figs. 6–9 there is shown a mandrel having somewhat different means for imparting relative circumferential movement to the sleeve 10 and bolt 11. Ring members 35 and 36 are provided with complemental partial teeth 37 and 38 respectively, the inner flat surfaces of which, indicated as 39 and 40, are inclined to the axis of the bolt as is best shown in Figs. 8 and 9. It will be appreciated how these surfaces will slide one on the other when the ring members 35 and 36 are moved toward each other by tightening nut 15 to increase the effective width of the composite teeth 41. Separate means are provided however for effecting of reversal of this sliding movement when nut 15 is turned so as to separate ring members 35 and 36. These means are preferably in the form of a stud 42 threaded into sleeve 10 and having a projecting end 43 projecting radially into an axially elongated slot 44 in bolt 11. Slot 44 has an angular tail portion 45, which is disposed so as to engage end 43 and thereby produce relative circumferential movement of ring members 35 and 36 when the bolt 11 is moved axially outwardly in sleeve 10 so that the inner tooth surfaces 39 and 40 are in contact and permit the mandrel to be loosely engaged with an internal spline or gear portion when in the unlocked condition. It will be observed that the axial portion of slot 44 is considerably larger in width than the tail portion 45 and that end 43 fits loosely in that portion of the slot. This play is provided so that the relative circumferential movement of ring members 35 and 36 is controlled during the locking operation by the angular surfaces 39 and 40 and during the unlocking operation by the tail portion of slot 44.

A second modified construction of mandrel is shown in Figs. 10–12. This mandrel, commonly known as a gear chuck, is adapted for engaging external teeth of a work piece for boring or grinding holes concentric with the pitch diameter of the teeth and for turning or grinding faces of work pieces perpendicular to the axial direction of the teeth. In this embodiment the chuck is shown as hydraulically actuated, but it will be appreciated that the chuck may be adapted for hydraulic, pneumatic, mechanical or similar actuation. In this form of chuck the external portion comprises a body member 46 having a bore 62 in which a hydraulic plunger 47 is arranged for axial and circumferential movement. The bore 62 is provided at its closed end with a port 64 through which fluid under pressure may be admitted from a suitable fluid motor (not shown) to move plunger 47 outwardly. When the fluid pressure is released plunger 47 may be pushed inwardly by manual operation. Plunger 47 is provided at its outer end with a head 48 which is arranged to reciprocate in a recessed bore 49 at the end of body 46. An annular retaining flange 50 is secured to the end of body 46 as by socket head screws 51. The complemental ring members 52 and 53 are secured to the plunger head 48 and ring flange 50, respectively, by means of additional screws 54 and 55.

Ring 53 is provided with partial teeth 56 and ring 52 with partial teeth 57. The inner faces of teeth 56 and 57 are at an angle to the axis of the plunger as indicated at 58, and the teeth overlap one another much the same as those described with reference to Figs. 6–9. The teeth however project inwardly and extend over the inner peripheral portions of the adjacent ring members. It will be seen that when plunger 47 moves outwardly, or to the right as shown in Fig. 10, the inner faces 58 of teeth 56 and 57 slide over each other and the effective size of the composite teeth 60 is increased.

Means interconnecting the plunger 47 and body 46 may, if desired, be provided for maintaining the inner faces 58 of the complemental tooth portions in contact during the unlocking operation, that is, when plunger 47 is manually retracted in body 46. These means may be similar to the stud and slot structure shown in Figs. 6 and 7.

It will thus be seen that the present invention provides a relatively simple and effective mandrel for holding gears and the like which is easy to operate and automatically centers the work piece on the mandrel. Although the exterior surfaces of the teeth of the mandrel may be formed either straight or as an involute, it will be appreciated that the successful operation of the mandrel is not dependent upon conformance of the mandrel teeth to the exact contour of the teeth of the work piece. All that is really necessary is for the mandrel teeth to abut firmly against the adjacent tooth portions of the work piece and this will naturally occur when the effective width of the mandrel teeth is increased as described. This enlarging tooth action serves to both center the work piece within the mandrel and allow the mandrel to be used for holding gears and the like having different sizes of teeth.

We claim:

1. A mandrel for gears and the like comprising a pair of interfitting members arranged for both relative axial and rotative movement, a plurality of partial teeth on each of said members having portions projecting from the members, said teeth being arranged so that when said members are disposed in cooperating relationship, said teeth are arranged in pairs with the projecting portion of each tooth overlapping a portion of the complemental tooth so as to provide a plurality of composite gripping teeth, and means responsive to the axial movement of one of said members relative to the other for rotating one of said members relative to the other to vary the effective width of said composite gripping teeth.

2. A mandrel for gears and the like comprising a pair of interfitting annular members arranged for both relative axial and rotative movement, a plurality of spaced partial gripping teeth on adjacent peripheral surfaces of each of said members and having portions projecting axially beyond said peripheral surfaces, said teeth being arranged so that when said annular members are disposed in cooperating relationship, said teeth are arranged in pairs with the projecting portion of each tooth extending over the peripheral surface of the other member and overlapping a portion of the complemental tooth so as to provide a plurality of composite gripping teeth, means for axially moving one of said members relative to the other, and means responsive to the relative axial movement of said members for rotating one of said members relative to the other whereby when said mandrel is interfitted with a gear or the like, said composite teeth may be expanded into firm engagement with the tooth portions of said gear by actuating said first mentioned means.

3. A mandrel for gears and the like comprising a pair of interfitting cylindrical members arranged for both relative axial and rotative movement, a plurality of spaced partial gripping teeth on adjacent peripheral surfaces of each of said members and having portions projecting axially beyond said peripheral surfaces, said teeth being arranged so that when said annular members are disposed in cooperating relationship, said teeth are arranged in pairs with the projecting portion of each tooth extending over the peripheral surface of the other member and overlapping a portion of the complemental tooth so as to provide a plurality of composite gripping teeth, means for axially moving one of said members relative to the other, comprising a threaded portion on one of said members and means engaged with said threaded portion and abutting against said other member, and means responsive to the relative axial movement of said members for rotating one of said members relative to the other to vary the effective width of said composite gripping teeth.

4. A mandrel for gears and the like comprising a pair of interfitting cylindrical members arranged for both relative axial and rotative movement, a plurality of spaced partial gripping teeth on adjacent peripheral surfaces of each of said members and having portions projecting axially beyond said peripheral surfaces, said teeth being arranged so that when said annular members are disposed in cooperating relationship, said teeth are arranged in pairs with the projecting portion of each tooth extending over the peripheral surface of the other member and overlapping a portion of the complemental tooth so as to provide a plurality of composite gripping teeth, means for axially moving one of said members relative to the other, and means interconnecting said members so as to rotate one of said members relative to the other and thereby vary the effective width of said composite gripping teeth when one of said members is moved axially relative to the other by said first mentioned means.

5. A mandrel for gears and the like comprising a pair of interfitting annular members arranged for both relative axial and rotative movement, a plurality of spaced partial gripping teeth on adjacent peripheral surfaces of each of said members and having portions projecting axially beyond said peripheral surfaces, said teeth being arranged so that when said annular members are disposed in cooperating relationship, said teeth are arranged in pairs with the projecting portion of each tooth extending over the peripheral surface of the other member and overlapping a portion of the complemental tooth so as to provide a plurality of composite gripping teeth, hydraulically actuated means for axially moving one of said members relative to the other, and means interconnecting said members so as to rotate one of said members relative to the other and thereby vary the effective width of said composite gripping teeth when one of said members is moved axially relative to the other by actuating said hydraulically actuated means.

6. A mandrel for gears and the like comprising a pair of interfitting members arranged for both relative axial and rotative movement, a plurality of partial teeth on each of said members having portions projecting from the members, said teeth being arranged so that when said members are disposed in cooperating relationship, said teeth are arranged in pairs with the projecting portion of each tooth overlapping a portion of the complemental tooth so as to provide a plurality of composite gripping teeth, the partial teeth being wider at one end than at the other with the wider portion of the teeth in each pair being disposed at opposite ends of said composite teeth, the adjacent faces of the partial teeth in each pair being disposed on an angle to the direction of the relative axial movement of said members, and means for moving one of said members axially relative to the other whereby said angularly disposed faces slide over one another and vary the effective width of said composite teeth.

7. A mandrel for gears and the like comprising a pair of interfitting members arranged for both relative axial and rotative movement, a plurality of partial teeth on each of said members having portions projecting from the members, said teeth being arranged so that when said members are disposed in cooperating relationship, said teeth are arranged in pairs with the projecting portion of each tooth overlapping a portion of the complemental tooth so as to provide a plurality of composite gripping teeth, the partial teeth being wider at one end than at the other with the wider portion of the teeth in each pair being disposed at opposite ends of said composite teeth, the adjacent faces of the partial teeth in each pair being disposed on an angle to the direction of the relative axial movement of said members, means for moving one of said members axially relative to the other whereby the effective width of said composite teeth is increased as said oppositely disposed wider ends of said partial teeth are moved towards each other, and means operable when said wider ends are moved axially away from each other for maintaining said angularly disposed surfaces closely adjacent each other.

8. A mandrel for gears and the like comprising a pair of interfitting cylindrical members having outer peripheral surfaces arranged to be disposed in end to end relationship, said members being arranged for both relative axial and rotative movement, a series of partial teeth spaced on the peripheral surface of each of said members and having portions projecting axially over the peripheral surface of the other member, said teeth being arranged in pairs with the projecting portions of the teeth in each pair overlapping a portion of the complemental partial teeth so as to form a plurality of composite teeth having substantially uniform cross sections between the overlapping portions thereof, the inner adjacent faces of the teeth in each pair being disposed at an angle to the direction of axial movement of said members, means for moving one of said members axially relative to the other to vary the extent of overlapping of said projecting portions and thereby vary the effective width of said composite teeth, and means operable when one of said members is moved axially to diminish the effective size of said composite teeth for urging the inner faces of the partial teeth in each pair to a contacting position.

9. A mandrel for gears and the like comprising a pair of interfitting cylindrical members having inner peripheral surfaces arranged to be arranged in end to end relationship, said members being arranged for both relative axial and rotative movement, a plurality of partial teeth spaced on the peripheral surface of each of said members and having portions projecting axially over the peripheral surface of said other member, said teeth being arranged in pairs with the projecting portions of the teeth in each pair overlapping a portion of the complemental teeth, so as to form a plurality of composite teeth having substantially uniform cross sections between the overlapping portions thereof, the inner adjacent faces of the teeth in each pair being disposed at an angle to the direction of axial movement of said members, means for moving one of said members axially relative to the other to vary the overlapping extent of said partial teeth and thereby vary the effective width of said composite teeth, and means urging the inner faces of said partial teeth in each pair to a contacting position when the relative axial movement of said members is such that the effective size of the composite teeth is diminished.

JOHN J. PARKER.
LONDON T. MORAWSKI.